Patented July 30, 1946

2,404,779

UNITED STATES PATENT OFFICE 2,404,779

PROCESS FOR THE COPOLYMERIZATION OF ASYMMETRICAL DIHALOGENATED ETHYLENES

Harold W. Arnold, Marshallton, Del., assignor to E. I. du Pont de Nemours & Company, Wilmington, Del., a corporation of Delaware No Drawing. Application August 19, 1941, Serial No. 407,415

7 Claims. (Cl. 260—84)

This invention relates to the copolymerization of asymmetrical dihalogenated ethylene with other polymerizable materials. More particularly, it relates to a new and improved process for the production of asymmetrical dichloroethylene copolymers.

This application is a continuation-in-part of copending application Serial No. 220,010, filed July 19, 1938 (now U. S. Patent No. 2,278,415, dated April 7, 1942), which was directed primarily to copolymers of asymmetrical dichloroethylene with at least two other selected polymerizable compounds.

The polymerization of asymmetrical dichloroethylene conjointly with selected unsaturated compounds by methods already disclosed in the literature frequently suffers from a number of disadvantages among which are the following:

1. Low reaction rate, which entails economic losses due to low space-time yield.
2. Difficulty in controlling the reaction. This is most frequently encountered in a bulk polymerization process in which no provision is made for conducting away the heat of reaction.
3. The tendency to produce low molecular weight products which are usually characterized by undesirable physical properties.

This invention has as an object to produce a new and improved method for the copolymerization of an asymmetrical dihalogenated ethylene, which process would overcome one or more of the above difficulties. Still another object is to provide a new and improved process for the production of copolymers of asymmetrical dichloroethylene. Other objects will be apparent from the following description of the invention.

These objects are accomplished by the following invention which comprises polymerizing asymmetrical dihalogenated ethylene with at least one other compound containing a terminal ethylenic linkage capable of vinyl polymerization, in aqueous emulsion, in which emulsion the aqueous phase contains a dissolved salt of perdisulfuric acid and a dispersing agent selected from the group consisting of

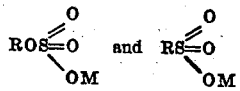

wherein R is an acyclic hydrocarbon of 12 to 18 carbon atoms and M is an alkali metal, said emulsion being a closed vessel which is maintained at a designated reaction temperature, preferably below 60° C.

In general, the customary procedure of practicing the invention is as follows: An aqueous medium which contains about 0.1 to 2% of a perdisulfate salt and about 1 to 5% of a dispersing agent of the preferred type, such as sodium cetyl sulfate, is adjusted to a pH of 2 to 4 by the addition of acid or an acid salt. This medium is then placed in a suitable pressure vessel, which is provided with a means of agitation such as stirring or shaking, followed by the material to be polymerized in such proportions that the ratio of the aqueous to the non-aqueous phase lies in the range of 2:1 and 3:1. The vessel is then closed and the mixture agitated vigorously to produce emulsification. It is thereafter heated at a constant temperature in the range of about 20° C. to about 50° C. with constant or intermittent agitation until the polymerization has proceeded to the desired extent.

The following examples, in which parts are given by weight unless otherwise stated, illustrate the practice of the invention.

Example I

The following dispersing solution is prepared:

|  | Parts |
|---|---|
| Sodium salt of sulfonated white oil, containing 32 to 35% of the active ingredient | 31 |
| Water | 465 |
| Ammonium perdisulfate | 0.75 |

The pH is adjusted to 2.5. One hundred-sixty parts of this solution is placed in a suitable pressure vessel and a mixture of 56 parts of asymmetrical dichloroethylene and 24 parts of methyl methacrylate. The vessel is closed and shaken vigorously to produce emulsification. It is thereafter maintained at 40° to 45° C. for a total of 8 hrs., after which the vessel is opened and the dispersion removed. The polymer is isolated by diluting the dispersion with an equal volume of water, heating to approximately 90° C., precipitating by the addition of 10 parts of 10% aluminum sulfate solution, filtering, and washing with water. After drying, there is obtained 76 parts of product or 95% of theory. It can be molded into clear, light colored, tough articles.

Example II

A dispersing solution is prepared as in Example I, and to 160 parts of this solution contained in a suitable pressure vessel is added a mixture of 64 parts of assymmetrical dichloroethylene and 16 parts of methyl acrylate. This vessel is closed and agitated continuously at 40° to 45° C. for a total of 8 hrs. At the end of this time the dispersion is removed and the polymer isolated as in Example I. The polymer obtained amounts to 71.5 parts. It may be molded into colorless, tough, resilient articles.

Example III

A dispersing solution is prepared as in Example I and to 100 parts of this solution contained in a glass vessel is added a mixture of 30 parts of asymmetrical dichloroethylene, 17.5 parts of methyl methacrylate, and 7.5 parts of vinyl acetate. The vessel is closed and agitated continuously at 32° C. for a total of 20.5 hours. At the end of this time the dispersion is removed and diluted with an approximately equal volume of water, and then neutralized by the addition of ammonium carbonate. There is then added one part of phenoxypropylene oxide. Thereafter the polymer is isolated from the dispersion as in Example I. The polymer obtained amounts to 54 parts. It may be molded to clear, light colored, tough articles.

Example IV

The following solution is prepared:

| | Parts |
|---|---|
| The dispersing agent described in Example I | 87.8 |
| Ammonium perdisulfate | 3.5 |
| Water | 1,300 |

One hundred parts of this solution is adjusted to pH 2.5 by the addition of 89% formic acid. The resulting solution is then placed in a glass vessel and a mixture of 40 parts of asymmetrical dichloroethylene and 10 parts of methyl alpha-chloroacrylate is added. The vessel is then closed and agitated continuously at 40° C. for a total of 16 hours. At the end of this time the polymerization is discontinued and the polymer is isolated as in Example I. It amounts to 46 parts.

Example V

The following solution is prepared:

| | Parts |
|---|---|
| The dispersing agent described in Example I | 50 |
| Ammonium perdisulfate | 2.2 |
| Water | 745 |

The pH of this solution is adjusted to 2.5 by the addition of 89% formic acid. To 720 parts of this solution contained in a glass pressure vessel is added 360 parts of monomer mixture containing 70% by weight asymmetrical dichloroethylene and 30% by weight of acrylonitrile. The air in the free space of the polymerization vessel is displaced by nitrogen and the vessel is then closed. It is thereafter agitated at 40° C. for a total of 42 hours. Isolation of the polymer as in Example I yields 320 parts. Moldings of the polymer are clear, very light colored, very rigid and tough. The polymer is shown by analysis for chlorine to contain 70.8% asymmetrical dichloroethylene.

The foregoing examples illustrate the superiority of certain classes of catalysts and dispersants in the copolymerization of asymmetrical dichloroethylene. It should be pointed out that these combinations of preferred catalysts and preferred dispersants are unique. In other words, it is not possible to attain equally good results by variation of the other experimental variables if any one requisite element of this invention is not satisfied. It should be further emphasized that the rapid copolymerization even at relatively low temperatures to give products of high molecular weight is surprising indeed since previous ordinary emulsion polymerizations were characterized by long polymerization cycles.

This invention is generic to the copolymerization of asymmetrical dihalogenated ethylenes, especially asymmetrical difluoro-, dichloro- and dibromo-ethylene. Among these compounds asymmetrical dichloro-ethylene is copolymerized most satisfactorily by the process of this invention, and is preferred. As indicated in the foregoing examples the process is applicable to the copolymerization of asymmetrical dihalogenated ethylenes with other materials which contain a terminal ethylenic linkage capable of vinyl polymerization. This provides an uniquely effective means for obtaining copolymers of asymmetrical dihalogenated ethylene with the following substances: methyl methacrylate, ethyl methacrylate, butyl methacrylate, octyl methacrylate, 2-nitro-2-methyl propyl methacrylate, methoxyethyl methacrylate, chloroethyl methacrylate, phenyl methacrylate, cyclohexyl methacrylate, and the corresponding esters of acrylic acid; acrylo- and methacrylonitrile. This invention is chiefly concerned with the polymerization of mixtures of asymmetrical dihalogenated ethylene and one other operable monomer which contain from 20 to 95% of asymmetrical dihalogenated ethylene by weight. It is apparent that the properties of the copolymers will depend largely on the type and amount of the other ingredient to be copolymerized with the asymmetrical dihalogenated ethylene. It is within the scope of this invention to copolymerize asymmetrical dihalogenated ethylene with two or more compounds which contain a terminal ethylenic bond capable of vinyl polymerization.

The polymerization catalysts encompassed by this invention include the water-soluble salts of perdisulfuric acid. In addition to the ammonium salt disclosed in the examples, there may also be used the sodium, potassium, lithium, barium, and calcium perdisulfates. It is observed that the sulfate ion appears in aqueous solutions of perdisulfates. For this reason, while the water-soluble alkaline earth metals salts are operable, they are not usually used because of their tendency to form a precipitate of the corresponding alkaline earth sulfate. The preferred salts are the ammonium and alkali metal salts. Ammonium perdisulfate is especially preferred for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product and rapidity of polymerization, the preferred proportion of perdisulfate salt lies in the range of 0.1% to 4% based on weight of monomer.

As operable dispersing agents in addition to those disclosed in the foregoing examples, there may be mentioned the alkali metal salts of the following long chain alkyl sulfates and sulfonates: dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants, and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are only useful when an operable dispersant is also present, may include inorganic salts, long chain primary alcohols, carbohydrate derivatives, polyvinyl alcohol, etc.

Using the rate of polymerization as a criterion, the invention encompasses the use of active ingredient concentrations of 0.2 to 5% in the aqueous medium in the copolymerization of asymmetrical dihalogenated ethylene. Within this range the preferred concentration will in general depend upon the proportion of monomer present, but is usually from 0.5 to 3%. From the standpoint of economy and the facility of removing the dispersing agent from the polymerized product, it is customary to use approximately the smallest amount of dispersing agent which promotes the rate of polymerization desired. It is to be understood that when reference is made to the use of definite percentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbo-mixers. The dispersing agents operable in this invention are in general useful in forming stable emulsions, which after they are once formed, require little or no agitation thereafter. It has been found, however, that polymerization occurs more rapidly in certain emulsions while they are being agitated. It is accordingly preferred to assist the dispersing agent in producing and maintaining the emulsion by mechanical means which may or may not be continuous. It should be emphasized that the dependence of the efficiency of the dispersing agents upon the active ingredient concentration and agitation in no way repudiates the sharp distinction previously noted between the dispersing agents operable in this invention and those which are not. Thus, with most of the inoperable dispersing agents it is impossible to obtain the rapid rate characteristic of the operable agents either by most vigorous agitation or by the use of concentrations as high as the solubility of the material will permit. Even in instances where such modifications of systems involving inoperable dispersing agents permit sufficient acceleration of the polymerization rate, the process is not practicable because of the expense and operating difficulties entailed by the use of very high proportions of dispersing agent.

The process of this invention may be carried out in alkaline, acid or neutral media. However, it is preferred to carry out the copolymerization in an aqueous medium whose pH may vary from about 1 to about 5 since this range appears to enhance the polymerization rate of the asymmetrical dihalogenated ethylenes. It is realized, however, the pH of the aqueous media used will depend on the nature of the monomer copolymerized with asymmetrical dihalogenated ethylene. For example, when vinyl esters of carboxylic acids are employed care must be taken to prevent the hydrolysis of the ester. Since the polymerization, in general, proceeds more slowly in environments of low acidity and since high acidity may cause excessive corrosion of the polymerization vessel, it is preferred that the polymerization be carried out at a pH of about 2 to about 4. If it is desired to avoid changes in pH during the course of polymerization, buffer mixtures may be added to the aqueous medium.

The operability of the invention is not confined to any particular proportion of polymerizable monomers relative to the amount of aqueous media present. Thus, the ratio of the aqueous to the non-aqueous phase may vary between approximately 10:1 and 1:1. In general, it is preferred that the aqueous/non-aqueous ratio shall be approximately 4:1 to 1:1 since for a given reaction vessel the time-space yield is greatly reduced by the use of higher ratios. It can be further said that higher aqueous/non-aqueous ratios generally tend to favor the production of lower molecular weight products. It is also helpful in maintaining an emulsion if the proportion of non-aqueous to aqueous phases is not greater than 1:1.

As is well known, the dependence of the rate of vinyl polymerization upon the temperature is very important, and low temperatures cannot be generally used because the corresponding rate of reaction is impracticably low. The present invention can be operated at any temperature above the freezing point of the aqueous phase which is somewhat below 0° C. up to about 80° C., above which the product may be adversely affected by the aqueous medium. It is preferred to employ temperatures in the range of 20° C. to 50° C.

It is realized that the presence of oxygen in the polymerization vessel, while not appearing to have a deleterious effect on the properties of the copolymers of this invention, may adversely affect the rate of polymerization in certain cases. In these cases it is, therefore, preferable to displace the air from the polymerization vessel by means of a gas which does not reduce the rate of polymerization. Suitable gases include nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization.

The process is not limited to any particular apparatus but it is important that the reaction vessel shall be constructed of material which has no effect on the rate of polymerization or on the quality of the products and is not affected by the aqueous medium used in carrying out the polymerization. Suitable vessels may be constructed from stainless steel, nickel, silver or lead. Vessels equipped with glass or enamel liners may also be used.

The copolymerization procedure generally followed in the present invention involves the addition of the entire amounts of each of the two polymerizable compounds to the aqueous medium followed by subsequent emulsification and polymerization of the aqueous dispersion. It is well known that the polymerization rate of the monomers operable in this invention are vastly different and, further, it may be found in copolymerizing asymmetrical dichloroethylene with one of the operable monomers that one of the monomeric materials polymerizes more rapidly than the other, thus giving use to products which may be characterized by non-homogeneity and other inferior physical properties. These effects are avoided to a great extent by using the present invention, but if additional improvement is desired, the polymerization process may so be modified that all of the more slowly polymerizing material is initially added to the aqueous medium along with a small proportion of the more rapidly polymerizing monomer, and thereafter additions of portions of the more rapid polymerizing monomer are made at the rate at which this material is used up. The emulsion process of this invention is also adapted to be carried out in a continuous manner.

At the conclusion of polymerization the products of this invention may be isolated as finely divided powders by a variety of methods. For example, the dispersion may be sprayed into a heated and/or evacuated chamber whereby the water is removed as vapor and the copolymer falls to the bottom of the chamber. The copolymer may also be isolated by cooling the dispersion below the freezing point of the aqueous medium or by the addition of a large volume of a lower aliphatic alcohol such as methanol or ethanol. The most satisfactory method consists in adding the appropriate amount of an electrolyte solution to the diluted aqueous dispersion with rapid agitation at a temperature just below the point at which the precipitated particles tend to cohere. This procedure yields a copolymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in the removal of last traces of dispersing agent and at the same time yields copolymers of improved heat stability. In order to facilitate low temperature drying of the copolymers it is beneficial to employ a final wash with a lower aliphatic alcohol such as methanol or ethanol. Before precipitation it may be advantageous to add to the dispersion small amounts of heat stabilizers such as those cited in application Serial No. 220,010, filed July 19, 1938 (now U. S. Patent No. 2,278,415, dated April 7, 1942), and/or small amounts of plasticizers such as dibutyl phthalate, tricresyl phosphate, and dibutyl sebacate.

In cases in which the products are to be used as coating or impregnating agents for porous materials, it is possible to apply the emulsion directly to the material to be coated without the intermediate isolation of the copolymer.

The products prepared according to the present invention may be used for the preparation of plastics, coatings, fibers, foils, films and adhesives. For any of these purposes, the copolymers may be combined with or prepared in the presence of plasticizers, stabilizers, fillers, pigments, dyes, softeners, natural resins or synthetic resins.

As many apparently widely different embodiments of this invention may be made without departing from the spirit and scope thereof, it is to be understood that this invention is not to be limited to the specific embodiments thereof except as defined in the appended claims.

I claim:

1. The process in accordance with claim 3 characterized in that the mixture of polymerizable compounds that are emulsified consists of asymmetrical dichloroethylene and an alkyl ester of an alpha-methylene aliphatic monocarboxylic acid.

2. The process in accordance with claim 3 characterized in that the dispersing agent is an aliphatic sulfonate prepared by the sulfonation of paraffinic mineral oils.

3. A polymerization process for obtaining a resinous material, which consists in emulsifying a mixture containing 20–95% by weight of an asymmetrical dihalogenated ethylene and a polymerizable compound from the group consisting of an alkyl ester and nitrile of an alpha-methylene monocarboxylic acid, in an aqueous medium having a pH ranging from about 1 to 5, an aqueous to non-aqueous phase ratio of from 10:1 to 1:1, and containing from 0.1% to 10%, based on the weight of the monomers, of a dissolved salt of perdisulfuric acid and from about .2% to 5% of a dispersing agent selected from the group consisting of

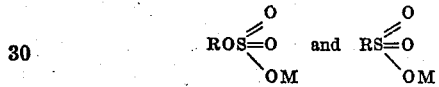

wherein R is an acyclic hydrocarbon radical of 12 to 18 carbon atoms and M is an alkali metal, and maintaining the resulting emulsion at a temperature ranging from 0° C.–80° C. until desired polymerization becomes effected.

4. A polymerization process for obtaining a resinous material which consists in emulsifying a mixture containing from 20–95% by weight of asymmetrical dichloroethylene and an alkyl ester of an alpha-methylene monocarboxylic acid in an aqueous medium having a ratio of aqueous to non-aqueous phase of from 10:1 to 1:1, a pH ranging from about 2 to 4 and containing from about 0.1%–4%, based on the weight of the monomers, of dissolved ammonium perdisulfate, and from about 0.5% to 3% of sodium cetyl sulfate as a dispersing agent, and then maintaining the resulting emulsion in contact with an atmosphere of nitrogen and at a reaction temperature within the range of from about 20° C.–50° C. until polymerization becomes substantially complete.

5. A polymerization process for obtaining a resinous material which consists in emulsifying a mixture containing from 20–95% by weight of asymmetrical dichloroethylene and methyl methacrylate in an aqueous medium having a ratio of aqueous to non-aqueous phase of from 10:1 to 1:1, a pH ranging from about 2 to 4 and containing from about 0.1%–4%, based on the weight of the monomers, of dissolved ammonium perdisulfate, and from about 0.5% to 3% of sodium cetyl sulfate as a dispersing agent, and then maintaining the resulting emulsion in contact with an atmosphere of nitrogen and at a reaction temperature within the range of from about 20° C.–50° C. until polymerization becomes substantially complete.

6. A polymerization process for obtaining a resinous material which consists in emulsifying a mixture containing from 20–95% by weight of asymmetrical dichloroethylene and acrylonitrile in an aqueous medium having a ratio of aqueous to non-aqueous phase of from 10:1 to 1:1, a pH ranging from about 2 to 4 and containing from about 0.1%–4%, based on the weight of the monomers, of dissolved ammonium perdisulfate, and from about 0.5% to 3% of sodium cetyl sulfate as a dispersing agent, and then maintaining the resulting emulsion in contact with an atmosphere of nitrogen and at a reaction temperature within the range of from about 20° C.–50° C. until polymerization becomes substantially complete.

7. A polymerization process for obtaining a resinous material which consists in emulsifying a mixture containing 20–95% by weight of asymmetrical dichloroethylene and acrylonitrile in an aqueous medium wherein a ratio of aqueous to non-aqueous phase of from 10:1 to 1:1 exists, said aqueous medium having a pH ranging from about 2–4 and containing from about 0.1%–4%, based on the weight of the monomers, of dissolved ammonium perdisulfate and from about 0.5% to 3% of the sodium salt of sulfonated white oil as a dispersing agent, and then maintaining the resulting emulsion in contact with an atmosphere of nitrogen and at a reaction temperature within the range of from about 20° C.–50° C. until polymerization becomes substantially complete.

HAROLD W. ARNOLD.